A. WARREN.
Hand Plow.
No. 25,066
Patented Aug. 9, 1859.
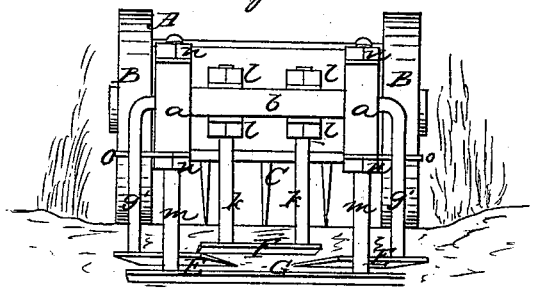
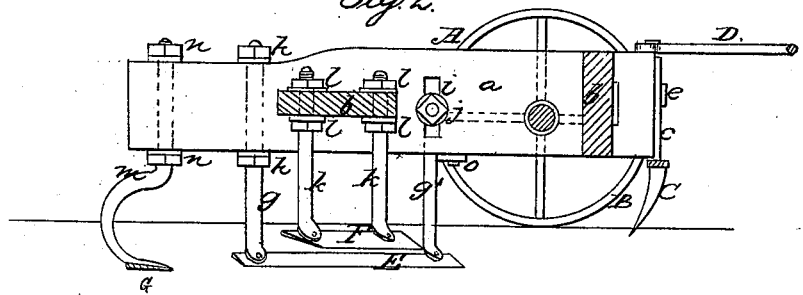
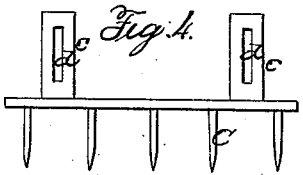
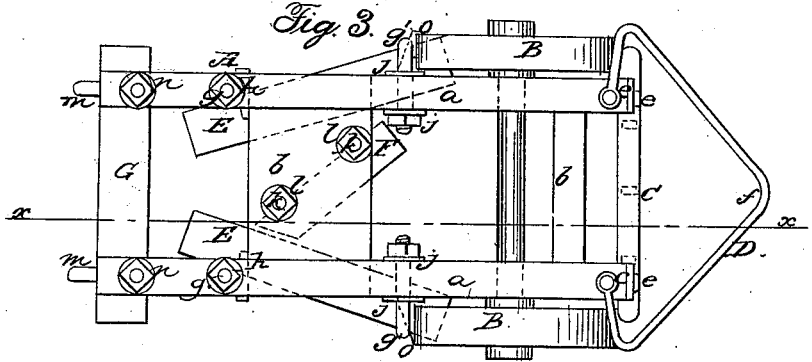
Witnesses.
Inventor.

UNITED STATES PATENT OFFICE.

AMSEY WARREN, OF WESTPORT, CONNECTICUT.

IMPROVEMENT IN CULTIVATORS.

Specification forming part of Letters Patent No. 25,066, dated August 9, 1859.

*To all whom it may concern:*

Be it known that I, AMSEY WARREN, of Westport, in the county of Fairfield and State of Connecticut, have invented a new and Improved Hand-Cultivator; and I do hereby declare that the following is a full, clear, and exact description of the same, reference being had to the annexed drawings, making a part of this specification, in which—

Figure 1 is a back view of my invention. Fig. 2 is a side sectional view of same, taken in the line $x\,x$, Fig. 3. Fig. 3 is a plan or top view of same. Fig. 4 is a detached face view of the rake of same.

Similar letters of reference indicate corresponding parts in the several figures.

This invention consists in the employment or use of a rake, hoe blades or shares, and a parting or deflecting bar attached to a mounted frame having a handle secured to it, by which the device may be shoved along manually between the rows of the crop under cultivation and the soil pulverized and all weeds eradicated.

The invention is applicable to the cultivation of all "hoed" crops, but is more especially designed for cultivating onions, which require a fine, well-worked friable soil in order to obtain a good crop.

To enable those skilled in the art to fully understand and construct my invention, I will proceed to describe it.

A represents a frame, which is formed of two side pieces, $a\,a$, connected by traverse-pieces $b$. This frame, near its front end, is supported by two wheels, B B, and a handle of any suitable length is attached to its back part.

To the front ends of the side pieces, $a\,a$, a rake, C, is attached. This rake is of the usual form, as shown clearly in Fig. 4, and it is provided with two upright plates, $c\,c$, which project from its head, are slotted longitudinally, as shown at $d$, and have screws $e$ passing through the slots in said plates and into the end pieces, $a$. By this arrangement it will be seen that the rake can be adjusted higher or lower, as may be desired.

To the upper surface of the frame A and at its front end a curved or bent bar, D, is attached. This bar is of V shape and projects some distance in front of the frame A, the angle $f$, formed by the bend, being in line with the center of the frame. (See Fig. 3.) The back parts of the rod extend out as far, or a trifle farther, than the wheels B. (See Fig. 3.) The bar D may be of wrought-iron. The rake C may be of malleable cast-iron.

To each side of the frame A a hoe or share, E, is attached. These hoes or shares are formed of steel plates attached to uprights $g\,g'$, the hoes or shares being slightly inclined from a horizontal position, the front or cutting edges being depressed. The uprights $g'\,g'$ are metal rods of suitable thickness, and the back rods, $g$, pass vertically through the side pieces, $a\,a$, of the frame, and are secured therein by jam-nuts $h$, screw-threads being cut on the rods to receive the nuts. The front rods, $g'$, are bent at their upper ends in a horizontal position and pass horizontally through the side pieces, $a\,a$, and are secured in vertical slots $i$ therein by jam-nuts $j$. By this mode of attaching the hoes or shares E to the frame they may be raised or lowered as desired, and also adjusted more or less obliquely with each other and the side pieces, $a\,a$, a certain degree of obliquity being always given said hoes or shares. (See Fig. 3.)

F is a hoe or share constructed precisely the same as the hoes E, and attached by vertical rods $k$ and jam-nuts $l$ to a traverse-bar of the frame. This hoe F has also an oblique position and is between the hoes E E.

To the back ends of the side pieces, $a\,a$, of the frame A, a hoe or share, G, is attached by curved rods $m\,m$. The upper parts of the rods $m$ are vertical and pass through the side pieces, $a$, and are secured therein by jam-nuts $n$. The hoe G has a position at right angles with the side pieces, $a$.

To the under side of each side piece, $a$, a metal plate, $o$, is attached, said plates being near the periphery of the wheels and preventing the soil from adhering thereto.

The operation is as follows: The operator grasps the handle, which is attached to the back part of the frame A, and shoves the implement along between the rows of the crop, the hoes or shares E E being adjusted laterally to suit the width of the space between the rows, and also adjusted vertically, as are the hoes F G and the rake C, according to the depth the hoes and rake are to penetrate the soil. As the implement is pushed along the bar D parts or throws aside the tops of the plants, so as to make room for the implement. The rake C breaks the clods and the hoes E E F G take out all weeds, leaving the soil in a fine or pulverized state, free from all weeds and permeable to air and moisture.

I do not claim any of the parts separately; but

I claim—

The parting or deflecting bar D, hoes or shares E E F G, and rake C, when applied to a suitable frame, A, provided with wheels B, the whole being arranged and combined to operate as and for the purpose set forth.

AMSEY WARREN.

Witnesses:
MYRON S. MASON,
ISAAC SHERWOOD.